UNITED STATES PATENT OFFICE.

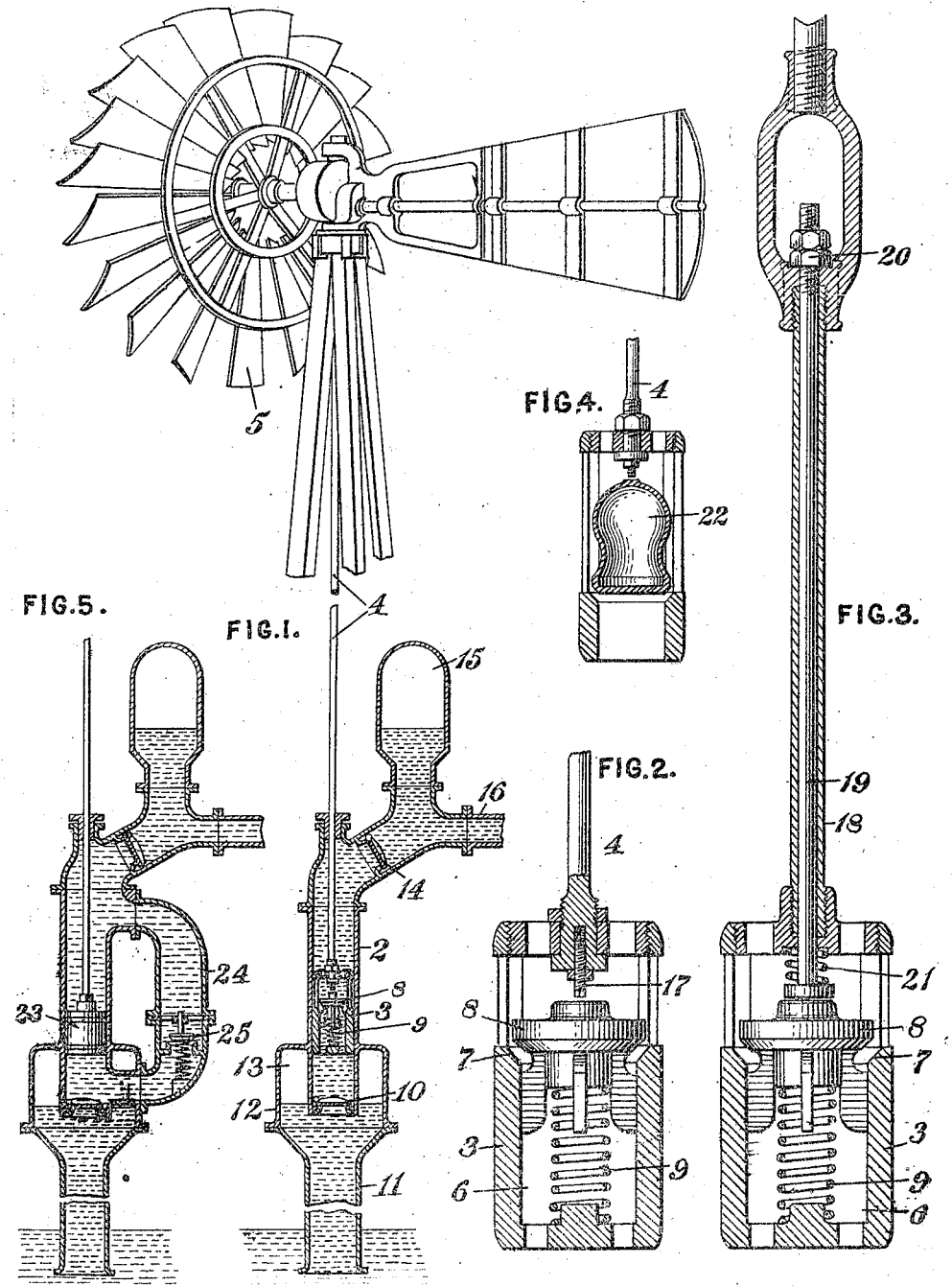

WILLIAM SNEE, OF WEST ELIZABETH, PENNSYLVANIA.

WINDMILL-PUMP.

1,001,176.  Specification of Letters Patent.  Patented Aug. 22, 1911.

Application filed October 5, 1910. Serial No. 585,483.

*To all whom it may concern:*

Be it known that I, WILLIAM SNEE, a resident of West Elizabeth, in the county of Allegheny and State of Pennsylvania, have invented certain new and useful Improvements in Windmill-Pumps, of which the following is a specification.

This invention relates to new and efficient means for utilizing velocities developed by wind mills and other variable power motors for controlling the load, provision being had for automatically relieving the motor of all load when its speed is below a predetermined rate, and for throwing on the load whenever the critical speed necessary to carry the load is exceeded.

The invention may be embodied in a fluid actuating, propelling, or lifting device which is operated by a motor of the character stated, with provision for releasing the fluid and thereby relieving the actuating device of load whenever the velocity of such device is below a predetermined rate, and with means for preventing the escape of fluid whenever the device attains or exceeds such rate. The present adaptation is in connection with a pump, the pump piston being connected to a wind wheel and moving therewith whenever the latter is in motion, but operating to lift or force fluid only when the power is sufficient to accomplish a lifting stroke, the same being determined automatically by the velocity of the piston. When below the requisite velocity, the motor and pump are not stalled as is now universally the case, the motor without load continuing to move and the piston continuing to make its strokes, but such strokes are idle or do no work until a sufficient velocity is attained to accomplish a pumping stroke, or part of such stroke, at which time the pump instantly becomes active and so remains as long as the requisite velocity is maintained. The action is thoroughly automatic, the load going off and on under predetermined velocity variations. While the pump is designed primarily for, and is here shown in connection with a wind wheel, and is so entitled, it may be operated by any variable power motor.

While various means have been proposed heretofore for utilizing low wind velocities, I believe I am the first to accomplish this result by so constructing the pump that it will run constantly with the wind wheel, but will take up the load only when the power is sufficient to accomplish the work without stalling the wheel. And with such control operating automatically, the greatest possible amount of energy is utilized, the arrangement being such that when the power is low the pump will skip any number of strokes between active strokes that may be necessary in order to accumulate sufficient energy for an active stroke. Under former practices this is quite impossible, the pump not operating in the absence of continuing power sufficient to run it, the result being that all of the power derived from low velocities is wasted.

In the accompanying drawings, Figure 1 is a vertical section of a pump constructed in accordance with the invention, the same being shown connected to a wind wheel. Fig. 2 is a sectional detail of the pump piston and bypass valve. Fig. 3 is a view of a valve similar to Fig. 2, with means for adjusting the throw of the valve. Fig. 4 is a valve of modified form. Fig. 5 is a vertical section of a pump of modified design.

Referring to the drawings, 2 designates the pump cylinder, and 3 the piston operatively connected by rod 4 in any suitable manner to wind wheel 5. The latter may be of any preferred design. Formed through piston 3 is vertical passage 6 through which the fluid being pumped flows upwardly on the down stroke of the piston. Within the upper portion of the piston is the upwardly facing valve-seat 7 adapted to receive valve 8 which may be held normally raised and unseated by spring 9.

At the lower end of the pump cylinder is the intake valve 10, which receives water from a well or other source through pipe 11. The upper end of the latter is preferably enlarged as indicated at 12 to form the air chamber 13 adjacent valve 10. A delivery valve 14 may be provided at the upper end of the pump cylinder, with air chamber 15 located in the delivery line 16 near valve 14.

Normally, in the adaptation here shown, the operation is not unlike that of any single acting pump, the fluid passing upwardly through the piston on the down-stroke, and the piston lifting and forcing the same through the delivery valve on the up-stroke. But when the power, as determined by the velocity of the piston, is insufficient to accomplish a working stroke, instead of the pump becoming stalled, valve 8 fails to close. Hence the up-stroke is merely idle, the water rushing downward through the spring-held valve and the piston continuing to churn back and forth through the water in the cylinder until the piston attains sufficient velocity on an up-stroke to close the valve against the pressure of spring 9, whereupon the pump immediately becomes active. The shock incident to the sudden setting in motion of the column of water would be serious excepting for the compensating effect of air chambers 13 and 15, which it is desirable to arrange as close as practicable to the inlet and outlet of the cylinder.

The action of the pump is practically instantaneous. If the wind velocity drops below a predetermined rate, the load is removed from the wheel before the pump resistance can stall it. As soon as the wind increases sufficiently the load is thrown on, this occurring just as soon as the velocity of the wheel and thereby its kinetic energy are sufficient for the work.

From the foregoing it will be seen that the pump will continue to work, though intermittently, at very low wind velocities, because pump strokes will be made as long as the wind is sufficient to speed the wheel beyond the critical velocity necessary to close valve 8. And that velocity may be adjusted low enough by varying the dimensions of valve 8 and the spring 9, to utilize wind velocities which are far below the possibilities of pumps as constructed and operated at the present time in connection with wind wheels.

With the present invention, the wheel will never stop excepting in a perfect calm. The slightest gust of wind will bring it up to a speed above the critical and thereby cause the pump to make a working stroke, or part of a working stroke, whereas with a mill of usual design, a sudden gust of wind would have to start the wheel from rest, overcoming far greater friction and inertia than is present when the wheel and piston are in motion.

The throw or travel of valve 8 may be increased or diminished, according as it is desired to decrease or increase the speed at which it closes, it being obvious that with its throw comparatively short it will seat more quickly and thereby more quickly throw the load on the wheel than if its throw is longer. In the adaptation shown in Figs. 1 and 2, the throw may be varied by an adjustable stud 17 overhanging the valve. As shown in Fig. 3, a tubular piston rod 18 may be provided, with a valve stem 19 extending therethrough and adjustable at its upper end by nut 20, with spring 21 at the lower end of the rod for depressing it as far as possible into the path of valve 8. Obviously also, pressure under which valve 8 closes may be varied by varying the strength of spring 9. A float valve 22, Fig. 4, may be substituted for the spring-raised valve 8.

A pump of modified design is shown in Fig. 5, wherein the piston 23 is closed and the bypass is in the form of a passage 24 connecting the upper and lower ends of the pump cylinder, with the upwardly opening spring valve 25 in said passage which performs the same function and operates in the same manner as valve 8 of the first described construction.

By the expression "predetermined velocity," I mean a velocity in which the current of water plus the inertia action of the valve, and the water immediately above it, overcome the forces holding the valve open. This inertia may change somewhat, though to a very limited extent, the value of the velocity of the piston at which closing of the bypass valve occurs. The predetermined or critical velocity which closes the bypass valve is otherwise independent of the velocity of the wind wheel. At high velocities this critical velocity will be reached very early in the stroke, so that the pump acts virtually as if the regulating feature did not exist. At lower speeds the valve may close when one-fourth, one-half, or any fractional part of the pumping stroke has been completed, as determined by the velocity of the piston when above the critical, while at velocities below the critical the valve will not close at all, thus relieving the wheel of all load.

While the embodiments here shown are in connection with single acting pumps, it is obvious that the invention is not thus restricted, nor is it restricted to the described location of the several valves and operating parts so long as they perform the operation underlying the invention.

I claim:—

1. The combination with a variable power motor, of a pump having its piston connected to the motor, and means controlled by the velocity of the piston for relieving it of all pumping load during one or a succession of strokes below a predetermined velocity.

2. The combination of a pump cylinder, a piston, a single bypass comprising the only means of communication between the spaces at opposite sides of the piston, a valve for the bypass closed during the lifting stroke of the piston when the latter exceeds a predetermined velocity, and means for holding the valve open until such predetermined velocity is attained.

3. The combination of a pump cylinder, a piston having a fluid passage therethrough, a tubular piston rod, a vertically movable upwardly opening valve for the piston passage, yielding means for normally holding the valve from its seat, and adjusting means operative in the tubular piston rod for varying the movement of the valve relatively to its seat.

4. The combination of a variable power motor, a reciprocating fluid actuating device driven by the motor, and means controlled by the velocity of said actuating device for entirely relieving the latter of load during one or a succession of strokes below a predetermined velocity.

5. The combination of a variable power motor, a fluid actuating device driven by the motor, a bypass when fully open entirely relieving said device of fluid imparted load, and a normally open valve for the bypass closing under pressure resulting from the actuating device attaining or exceeding a predetermined velocity.

6. The combination of a pump cylinder, a piston, a normally open bypass of sufficient area to pass—on the charging stroke of the piston—a full quota of liquid to be lifted and to pass the same liquid on the discharging stroke when the bypass remains fully open; a valve for the bypass which closes under predetermined velocity of the piston on its discharging stroke, and a spring holding the valve open until such predetermined velocity is attained.

7. The combination of a pump cylinder, a piston having a passage through which flows upwardly all the fluid to be lifted, a downwardly seating valve for the passage, and a spring holding the valve normally open and closing only when the piston attains predetermined velocity on its upward stroke.

In testimony whereof I affix my signature in presence of two witnesses.

WILLIAM SNEE.

Witnesses:
J. M. NESBIT,
F. E. GAITHER.